United States Patent [19]

Gould, deceased

[11] Patent Number: 5,028,323
[45] Date of Patent: Jul. 2, 1991

[54] FILTER FOR CORROSIVE LIQUIDS

[76] Inventors: Leon B. Gould, deceased, late of Danbury; by Genevieve Gilbert, executrix 3 Windmill Rd., New Fairfield, both of Conn. 06812

[21] Appl. No.: 429,569

[22] Filed: Oct. 31, 1989

[51] Int. Cl.⁵ .......................................... B01D 27/00
[52] U.S. Cl. .............................. 210/232; 210/323.2; 210/437; 210/440; 210/442; 210/445; 210/450; 210/454
[58] Field of Search .................. 210/232, 321.8, 321.9, 210/323.2, 435, 437, 440, 442, 445, 450, 454, 457

[56] References Cited

U.S. PATENT DOCUMENTS

| | | | |
|---|---|---|---|
| 654,592 | 7/1900 | Barr | 210/323.2 |
| 757,560 | 8/1904 | Goreau | 210/457 |
| 1,632,960 | 6/1927 | Giese . | |
| 2,022,164 | 11/1935 | Sweetland | 210/450 |
| 2,083,005 | 6/1937 | Czarnecki | 210/165 |
| 2,411,238 | 11/1946 | Zender | 210/321.8 |
| 2,440,487 | 9/1943 | Rayburn | 210/184 |
| 2,754,005 | 11/1953 | Tursky | 210/323.2 |
| 2,772,786 | 12/1956 | Gardes | 210/323.2 |
| 2,833,416 | 5/1958 | Wilkinson | 210/440 |
| 2,857,052 | 10/1958 | Searle | 210/440 |
| 3,017,032 | 1/1962 | Urdanoff | 210/323.2 |
| 3,237,770 | 3/1966 | Humbert | 210/442 |
| 3,442,390 | 5/1969 | Petrucci et al. | 210/323.2 |
| 3,615,016 | 10/1971 | Soriente et al. | 210/232 |
| 3,846,307 | 11/1974 | Petrucci et al. | 210/450 |
| 3,950,251 | 4/1976 | Hiller | 210/232 |
| 4,052,317 | 10/1977 | Palnik | 210/450 |
| 4,187,179 | 2/1980 | Harms | 210/238 |
| 4,331,535 | 5/1982 | Pett | 210/450 |
| 4,402,828 | 9/1983 | Edens | 210/323.2 |
| 4,455,227 | 6/1984 | Harms et al. | 210/184 |
| 4,460,468 | 7/1984 | Morgan | 210/450 |
| 4,517,086 | 5/1985 | Romey et al. | 210/323.2 |
| 4,526,689 | 7/1985 | Morgan | 210/323.2 |
| 4,552,661 | 11/1985 | Morgan | 210/232 |
| 4,693,820 | 9/1987 | Baxter | 210/457 |

Primary Examiner—Stanley Silverman
Assistant Examiner—Robert James Popovics

[57] ABSTRACT

The invention provides a liquid filter which is economically fabricated from commercially available flat and tubular plastics stock. The filter is openable from the top of replace filter elements carried by filter pipes that are rigid with the lower casing structure, all without disturbing the inlet and outlet fittings of the filter. At the casing top there is a connector block which has both such fittings and which is permanently attached to the lower casing structure. Removably attached to the connector block is a cap construction which has an outlet manifold passage that communicates, via a separable joint, with the outlet fitting of the connector block. Non-leak separable sealing joints are provided between the filter pipes and the cap construction, at the manifold passage.

17 Claims, 2 Drawing Sheets

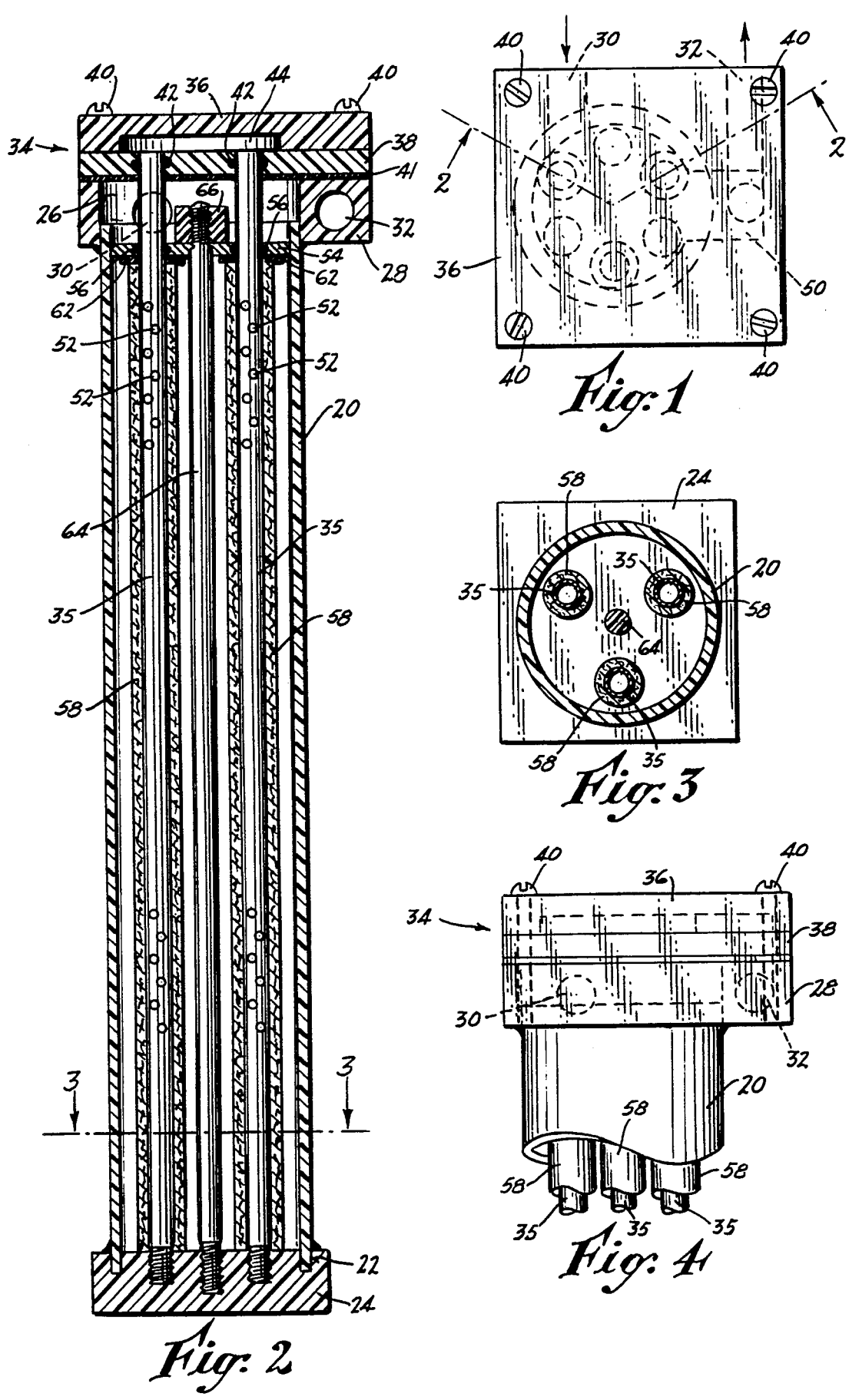

FILTER FOR CORROSIVE LIQUIDS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to filters for liquids, and more particularly to filtering devices intended to withstand appreciable pressures and for use with corrosive liquids such as plating baths and the like.

2. Description of the Related Art Including Information Disclosed Under 37 CFR §§1.97–1.99

U.S. Pat. No. 1,632,960 discloses a liquid filter wherein the inlet and outlet fittings are carried by a casing and do not interfere with removal and replacement of filter elements that are mounted on a removable head. However, the entire set of elements when clogged must be removed as a unit and such elements, being hung, are susceptible to damage and require compressive strength in the form of a built-in support or structure means whereby their fabrication is costly. Moreover, limitations exist as to the size and extent of filtering that the disclosed elements are capable of. The design does not lend itself to immersion of the lower portion of the filter in a bath, if this should be found desirable.

U.S. Pat. No. 2,083,005 shows a top-replacement filter device wherein a collapsible basket element has an inner spring to counteract the force of the incoming liquid. As the sediment builds up, the basket element is under continuing pressure and loses its effectiveness, as well as being susceptible to collapse.

U.S. Pat. No. 4,187,179 discloses filter elements which include elongate perforated structural members, but the filtering portions of the same are not adequately supported to withstand appreciable loading and can bulge outward, malfunction and fail when overloaded.

U.S. Pat. No. 4,402,828 discloses a plastic filter intended for use with acid liquids, wherein inlet and outlet connections can remain undisturbed during filter replacement, and wherein non-rigid filter sleeves are supported by rigid perforated inner tubes and are capable of replacement from the top of the casing. However, for such replacement obviously the entire casing, sealed at its bottom by O-rings, must be removed in order to unfasten and pull off the clogged filter sleeves, and replace them.

U.S. Pat. No. 4,552,661 discloses a filter with fixed inlet and outlet fittings and an openable cap for removal of filter bags which collect residue internally and are liable to rupture when overloaded, as well as to interfere with one another if they bulge outward. Access to the casing interior for cleaning purposes is restricted, and the arrangement does not lend itself readily to immersion in a bath, where such an installation might be desirable. Limitations exist, as well, as to the thickness of the walls of the bags and the costs of fabrication of the same.

U.S. Pat. No. 4,455,227 discloses a heat-exchange filter device wherein all of the filter elements are carried by the top cover plate and removable as a unit, as distinguished from filter elements which can be removed individually. This makes for a cumbersome replacement procedure, which is undesirable when dealing with the corrosive or acid liquid baths. The device is obviously not suitable or intended for immersion in a liquid bath.

U.S. Pat. No. 4,517,086 shows a filter device wherein the outlet fitting must be disconnected prior to opening of the casing and replacement of the filter element.

U.S. Pat. No. 4,526,689 shows a strainer device wherein individual rigid baskets fit into sockets in a top plate. However, the baskets are not tightly sealed to the top plate, nor are there bottom-mounted supports for the baskets, rigidly carried by the bottom plate of the casing.

SUMMARY OF THE INVENTION

The above disadvantages and drawbacks of prior liquid filtering devices are obviated by the present invention, and one object of the invention is to provide an improved liquid filter device which can be readily fabricated from commercially available plastics stock and which is especially effective in filtering corrosive solutions, such as plating baths and the like.

Another object of the invention is to provide an improved filter as above set forth, wherein the removal and replacement of the filter elements is especially easy and convenient.

Yet another object of the invention is to provide an improved filter in accordance with the foregoing, which is simple and economical in its construction.

A feature of the invention is the provision of an improved filter device as above characterized, which is small in size and of light weight while at the same time being especially strong and rugged so as to withstand adverse conditions of use.

A further object of the invention is to provide an improved filter as outlined above, wherein the filtering elements are especially effective in filtering the liquid medium while at the same time being economical to fabricate whereby the overall cost of the filter, and replacement of the elements is relatively low.

An important feature of the invention involves a unique construction that is provided, whereby both flat plastics stock and tubular plastics stock are utilized, specifically enabling the filter casing and portions of the filtering units to be of commercially available tubular stock, and enabling upper connection and ducting portions of the filter to be of commercially available flat stock.

Another feature of the invention involves the use of flat plastics stock to produce a unique fitting connection structure whereby fittings need not be disturbed during filter replacement, and to produce a unique liquid-conducting sealed manifold junction between certain tubular filter parts and the said fitting connection structure.

Still another feature of the invention is the provision of a novel multiple sealing means or combination at the upper portions of individual filtering units, to insure that the liquid medium in the filter follows the correct paths at all times.

Other features and advantages will hereinafter appear.

BRIEF DESCRIPTION OF THE DRAWINGS

In the accompanying drawings:

FIG. 1 is a top plan view of the improved liquid filter as provided by the invention.

FIG. 2 is a vertical section taken on the line 2—2 of FIG. 1.

FIG. 3 is a transverse section of the filter, taken on the line 3—3 of FIG. 1.

FIG. 4 is a fragmentary side elevation of the top portion of the filter.

DESCRIPTION OF THE PREFERRED EMBODIMENT

Figure 5:
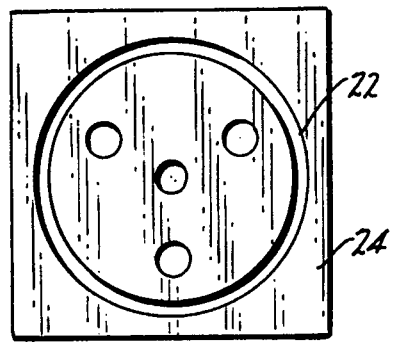
FIG. 5 is a top plan view of the bottom plate of the filter casing.
Figure 6:
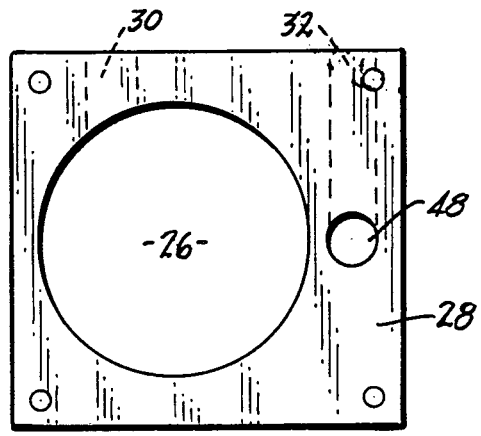
FIG. 6 is a top plan view of the connector member of the filter, to which liquid fittings are attachable.
Figure 9:
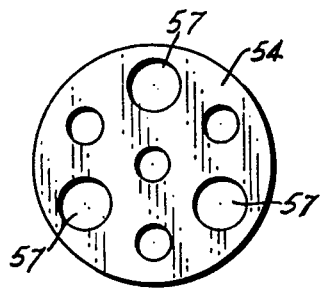
FIG. 9 is a top plan view of the clamping disk of the filter.

As shown in the illustrations of the preferred embodiment, the improved filter of the invention comprises an upright columnar casing 20 in the form of a cylinder made from commercially available tubular stock, having its lower end set in a circular groove 22 of a rectangular bottom plate 24 formed of commercially available flat plastics stock, and its upper end received in a circular recess or passage 26 of a top connector member 28 also formed of commercially available flat plastics stock. The recess 26 of the connector member 28 constitutes a liquid passage for receiving liquid which is to be filtered, as will be explained below.

The parts 20, 24 and 28 are preferably constituted of acid-resistant plastic, such as PVC, and are welded to each other in the positions indicated so as to constitute liquid-tight rigid joints.

In accordance with the invention, the connector member 28 is provided with a first connection means 30 that communicates with the passage 26 for conducting to it liquid which is to be filtered, and also provided with a second connection means 32 for connection with a liquid outlet, to carry away the filtered liquid. The connection means 30 and 32 are in the form of threaded bores adapted to receive threaded pipe or tube fittings (not shown), as can be understood.

Further, according to the invention, there is provided for cooperation with the connector member 28 a unique liquid-conducting manifold junction which is constituted as a cap construction 34 formed of commercially available flat plastics stock, that functions as a manifold for connection with the outlet means 32 to bring the filtered liquid to said means after the liquid has passed through filtering elements shortly to be described. The cap construction 34 encloses the liquid passage 26 of the member 28 and, in conjunction with filter tubes 35 formed from commercially available plastic tubes passing into it, seals off the passage 26 at its top.

As shown, the cap construction 34 preferably is constituted of two parts in the form of a pair of superposed flat plastic plates 36 and 38 formed of PVC plastic which are sealed to each other, as by means of cement or glue. The cap construction 34 is shown as attached to the connector member 28 by screws 40 which can advantageously be of stainless steel or PVC plastic. The cap construction 34 is advantageously sealed to the connector member 28 by use of a rubber gasket 41.

In the present embodiment of the invention, three of the filter tubes 35 are illustrated, although either a greater or lesser number can be employed. The filter tubes 35 are threaded into the bottom plate 24, being received in blind holes so as to be sealed at their bottoms and also rigidly supported thereby. At their tops, the filter tubes 36 pass through the lower plate 38 of the cap construction 34 and are sealed thereto by O-rings 42. The tubes 35 open into a manifold flow passage 44 in the upper plate 36, which communicates with the second connection means 32 by means of mating or aligned separable conduit means or openings 46 and 48 respectively in the plate 38 and connector member 28.

Figure 7:
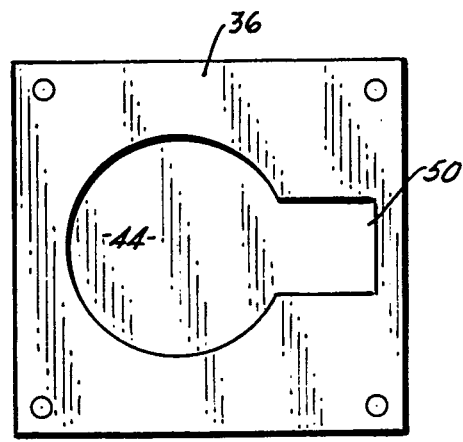
FIG. 7 is a plan view of the underside of the upper cap member of the filter.

As seen in FIG. 7, the manifold passage 44 in the plate 36 has an extension portion 50 that communicates with the opening 46 of the lower plate 38. The filter tubes 35 have multiple openings 52 to provide for liquid passage between the inner and outer areas of the tubes. The tubes 35 pass through a perforated clamping plate 54 which carries O-rings 56 that seal the plate to the tubes, and the clamping plate 54 has flow-through openings 57 to enable liquid flow to occur from the passage 26 of the connection member 28 to the areas surrounding the exteriors of the filter tubes 35.

With the above arrangement liquid can enter at the port 30 into the passage 26, pass downward through the openings 57 into the spaces surrounding the filter tubes 35, then pass into the tubes through the perforations 52, travel upward in the tubes 35 and out at the tops thereof into the manifold passage 44, thence through the extension 50 and openings 46 and 48 and out through the port 32.

According to the invention, in conjunction with such passage of liquid the volume of that portion of the same which is located within the casing 20 is efficiently filtered, and the filtering medium is so constituted that it can be easily and quickly replaced or renewed from time to time, as becomes necessary.

Figure 10:
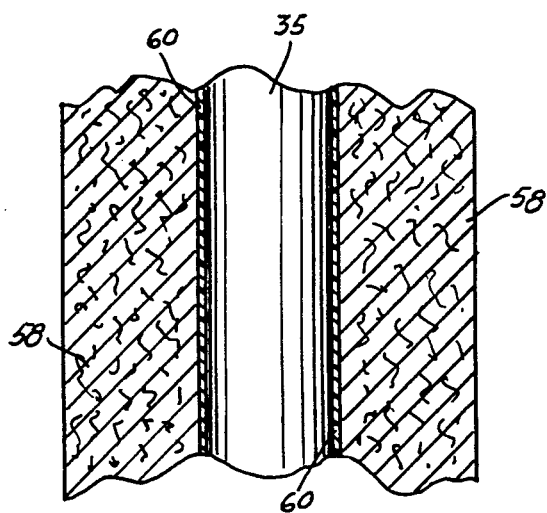
FIG. 10 is a fragmentary vertical sectional detail, enlarged, of one of the filter tubes and its filter sleeve.
Figure 8:
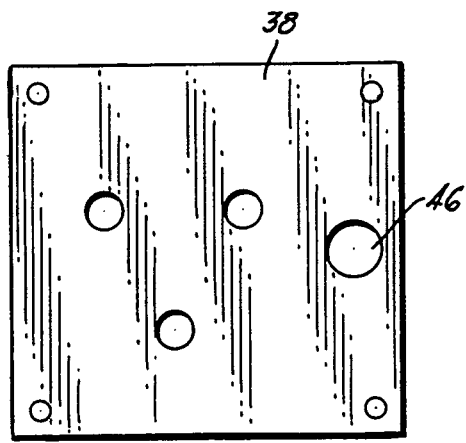
FIG. 8 is a top plan view of the lower cap member of the filter.

In accomplishing this, there are provided filter sleeves 58 surrounding the tubes 35, these being preferably constituted of cotton filaments or threads which are spun or wound on thin liquid-permeable cores 60, see FIG. 10 which shows a filter tube portion greatly enlarged. The cores 60 can be constituted of thin-walled PVC plastic having a diameter to enable them to be easily slid onto the tubes 35. The filter tubes 35 can be approximately $\frac{3}{4}''$ in diameter, and the cotton filtering sleeves can be spun to a final diameter of $2\frac{1}{4}''$. The casing 20 can have a diameter of approximately 6".

Between the top ends of the filter elements or sleeves 58 and the underside of the clamping plate 54 are rubber washers 62 which seal against the sleeves and the clamp plate. The washers 62 are maintained under compression by a long PVC draft bolt 64 which passes through the plate 54 and has threaded on its upper end a PVC nut 66. The bolt 64 is threaded into the bottom plate 24 and is rigid and stationary therewith.

It will be seen that the O-rings 56 and washers 62 constitute a means which effects a seal between the upper ends of the sleeves 58, the clamp plate 54 and the upper exteriors of the filter tubes 35. Also, such seal cooperates with the seal effected by the O-rings 42 between the plate 38 and the upper extremities of the tubes 35, so as to make the chamber 26 liquid-tight; the nut 66 clamping against the top of the plate 54 prevents loss of liquid at the center of the plate.

Replacement of the filter elements 58 can be easily and quickly effected, all without uncoupling the fittings or connections to the connection means 30 and 32. It is merely necessary to release the fastenings or bolts 40 and remove the cap assembly or construction 34 so as to expose the large central nut 66. This nut is then removed, enabling the clamp plate 54 to be lifted out, after which the filter elements 58 are lifted off the tubes 35 and replaced by fresh filter elements. The rubber washers 62 are put back in place on the tops of the new elements 58, the clamp plate 54 is replaced and the nut 66 applied and tightened.

The disclosed filter has been found to be capable of filtering out particles having a size on the order of 2 microns, with particular effectiveness.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A filter for liquids, comprising in combination:
   a) an elongate perforated upright filter pipe having a top opening, said pipe providing a conduit for said liquids,
   b) a connector member having a liquid passage through which an upper end portion of the filter pipe extends, and having a first connection means communicating with said passage for conducting thereinto liquid which is to be filtered,
   c) said connector member having a second connection means for connection with a liquid outlet to carry away filtered liquid,
   d) a cap construction and means for securing the same to the connector member in a position to enclose the top opening of the filter pipe, said cap construction having a flow passage communicating with said top opening, and having means providing a non-leak separable sealing joint with said upper end portion of the pipe,
   e) said cap construction and connector member having mating separable conduit means for effecting communication exclusively between the said passages thereof,
   f) an upright filter sleeve surrounding said filter pipe and enclosing the perforations thereof,
   g) means effecting a liquid-tight seal between an upper portion of the filter sleeve and the exterior of said upper portion of the filter pipe, and
   h) a filter casing surrounding said filter pipe and filter sleeve, the interior of said filter casing being in communication with the said liquid passage of the connector member.

2. A filter as set forth in claim 1, wherein:
   a) the casing comprises a columnar member and a bottom plate attached to said columnar member,
   b) said filter pipe being rigidly attached to said bottom plate.

3. A filter as set forth in claim 2, wherein:
   a) said filter sleeve at its bottom end seals against said bottom plate.

4. A filter as set forth in claim 1, wherein:
   a) the casing comprises a cylinder,
   b) said connector member having a circular recess in which the upper end of the casing is received,
   c) said casing and connector member being welded to each other.

5. A filter as set forth in claim 3, wherein:
   a) the casing comprises a cylinder,
   b) said connector member having a circular recess in which the upper end of the casing is received,
   c) said casing and connector member being welded to each other,
   d) said connector member, casing and bottom plate being constituted of PVC plastic material,
   e) said bottom plate having a circular recess in which the bottom end of the cylinder is received,
   f) said cylinder and bottom plate being welded to each other.

6. A filter as set forth in claim 1, wherein:
   a) said cap construction comprises a pair of superposed plates sealed to each other,
   b) one of said plates having the said flow passage.

7. A filter as set forth in claim 6, wherein:
   a) the means providing the said separable sealing joint comprises an O-ring carried by the other of said plates.

8. A filter as set forth in claim 1, wherein:
   a) the means which provides the sealing joint with the upper end portion of the pipe comprises an O-ring carried by the cap construction and encircling said pipe.

9. A filter as set forth in claim 1, wherein:
   a) said cap construction and connector member are constituted of slabs of flat commercially available plastics stock disposed in superposed relation,
   b) said filter pipe and filter casing being constituted of commercially available tubular plastics stock.

10. A filter for liquids, comprising in combination:
    a) a plurality of elongate perforated upright filter pipes having top openings, said pipes providing conduits for said liquids,
    b) a connector member having a liquid passage through which upper end portions of the filter pipes extend, and having a first connection means communicating with said passage for conducting thereinto liquid which is to be filtered,
    c) said connector member having a second connection means for connection with a liquid outlet to carry away filtered liquid,
    d) a cap construction and means for securing the same to the connector member in a position to enclose the top openings of the filter pipes, said cap construction having a passage communicating with said top openings, and having means providing non-leak separable sealing joints with said upper end portions of the pipes,
    e) said cap construction and connector member having mating separable conduit means for effecting communication exclusively between the said passages thereof,
    f) a plurality of upright filter sleeves respectively surrounding said filter pipes and enclosing the perforations thereof,
    g) means effecting liquid-tight seals between upper portions of the filter sleeves and the exteriors of said upper portions of the filter pipes, and
    h) a filter casing surrounding said filter pipes and filter sleeves, said casing having a bottom plate and the interior of said casing being in communication with the said liquid passage of the connector member,
    i) a clamp plate having apertures in which said upper portions of the filter pipes are received, and j) a draft bolt connected between the clamp plate and said bottom plate to pull the plates toward each other, k) said clamp plate being included in the means which effects the said liquid-tight seals.

11. A filter as set forth in claim 10, and further including:

a) O-rings carried by the clamp plate and encircling the filter pipes, to effect separable seals between the said pipes and the clamp plate.

12. A filter as set forth in claim 11, wherein:

a) the means providing the said separable sealing joints comprises O-rings carried by the cap construction and engaging the exteriors of the filter pipes.

13. A filter as set forth in claim 10, wherein:

a) the draft bolt includes a nut disposed over the clamp plate and adapted to apply pressure thereto.

14. A filter as set forth in claim 10, wherein:

a) the means effecting the liquid-tight seals comprises resilient washers encircling the filter pipes and engaging the top ends of the filter sleeves.

15. A filter as set forth in claim 14, wherein:

a) the clamp plate is loosely carried in the filter casing and engages the tops of said resilient washers, b) said draft bolt forcibly holding the clamp plate against said washers.

16. A filter as set forth in claim 10, wherein:

a) said filter pipes and said draft bolt are rigidly affixed to the bottom plate of the filter casing.

17. A filter as set forth in claim 10, wherein:

a) the means for securing the cap construction to the connector member comprises a plurality of screws to enable quick and convenient removal of the cap construction.

* * * * *